United States Patent [19]

Johnson

[11] Patent Number: 5,109,610
[45] Date of Patent: May 5, 1992

[54] TRUE POSITION PROBE

[76] Inventor: James D. Johnson, 3141 W. 925 North, West Point, Utah 84105

[21] Appl. No.: 690,060

[22] Filed: Apr. 23, 1991

[51] Int. Cl.$^5$ .......................... G01B 5/03; G01B 7/03
[52] U.S. Cl. ...................................... 33/559; 33/561; 33/556; 33/503
[58] Field of Search ................. 33/556, 557, 558, 559, 33/560, 561, 503

[56] References Cited

U.S. PATENT DOCUMENTS

| | | | |
|---|---|---|---|
| 2,755,557 | 7/1956 | Witchger | 33/556 |
| 3,368,283 | 2/1968 | Vasseur | 33/556 |
| 3,660,906 | 5/1972 | Zimmerman | 33/559 |
| 3,812,590 | 5/1974 | Nigg et al. | 33/556 |
| 4,078,314 | 3/1978 | McMurtry | 33/503 |
| 4,131,365 | 12/1978 | Pryor | 356/356 |
| 4,542,590 | 9/1985 | Cusack . | |
| 4,601,111 | 7/1986 | Berchtold | 33/556 |
| 4,651,436 | 3/1987 | Gaal | 33/533 |
| 4,662,752 | 5/1987 | Tucker et al. | 356/375 |
| 4,790,545 | 12/1988 | Dzewaltowski et al. | 33/645 |
| 4,800,652 | 1/1989 | Ballas et al. | 33/508 |
| 4,854,050 | 8/1989 | McMurtry | 33/558 |
| 4,927,590 | 11/1990 | Kadosaki et al. | 33/556 |
| 4,937,948 | 7/1990 | Herzog et al. | 33/559 |
| 4,941,266 | 7/1990 | Bissegger et al. | 33/556 |

FOREIGN PATENT DOCUMENTS

| | | | |
|---|---|---|---|
| 0215851 | 11/1984 | Fed. Rep. of Germany | 33/556 |
| 3701730 | 8/1988 | Fed. Rep. of Germany | 33/556 |
| 1095J28 | 5/1984 | U.S.S.R. | 33/556 |

Primary Examiner—William A. Cuchlinski, Jr.
Assistant Examiner—Alvin Wirthlin
Attorney, Agent, or Firm—Trask, Britt & Rossa

[57] ABSTRACT

The present invention is directed to a contact-type probe for obtaining positional information concerning a workpiece characteristic, simultaneously in more than one positional axis. The probe comprises a probe body for mounting in a machine tool and to which other components may be mounted, a double swivel joint mounted to the probe body and a probe shaft mounted to the swivel and carrying a workpiece contact on one end. In operation, the workpiece contact attached to the probe shaft is moved over the workpiece, and the contact engages a characteristic such as an aperture in the workpiece. The probe body remains in a defined position, while the probe shaft may swivel in two axes to engage the characteristic. The magnitude of displacement necessary for the probe shaft to engage the characteristic may be determined to provide positional information concerning the characteristic.

9 Claims, 5 Drawing Sheets

TRUE POSITION PROBE

BACKGROUND OF THE INVENTION

1. Field

This application relates generally to position sensing probes and, more specifically, to position sensing probes capable of sensing position simultaneously in two axes of a plane defined by cartesian coordinates.

2. State of the Art

Position information concerning various characteristics of a manufactured workpiece is important to quality control of the workpiece. Inspection of a characteristic, such as an aperture in a surface, is frequently accomplished with the use of a coordinate measuring machine (CMM). The CMM can be numerically programmed to measure sequentially the position of many characteristics on a workpiece. The inspection data can then be used to verify machine setups or to monitor quality control.

The probe which extends from the CMM to communicate positional information can be either the contact type, such as a stylus, or the non-contact type, such as a laser sensing device. The contact-type probe must relay the contact event to a sensing device while, in many cases, the non-contact probe is itself a sensing device.

Sensors are typically located so that each sensor receives positional information relating to some aspect of the system defining the position. For example, if an aperture is located in a surface of a workpiece according to coordinates in a cartesian coordinate volume, a sensor would be required on each of the X, Y, and Z axes defining the coordinate system.

Several numerically controlled CMM's are capable of determining X, Y, and Z coordinates. These machines are sophisticated devices utilizing computer control of servomotors, sliding rail systems for probe movement in the relevant axes, and data acquisition and storage. The machines are expensive, large, and difficult to move and set up.

A contact sensing probe that produces an output signal when the probe's stylus engages a workpiece is disclosed in U.S. Pat. No. 4,854,050 to McMurtry. The device is used to measure the dimensions of a workpiece while supported by a fixed machine. The invention in McMurtry utilizes a probe stylus in communication with a strain sensitive element serving as the sensing means. When the probe stylus contacts the workpiece, a shock wave generated by the contact is transmitted to the strain sensitive element which produces an output signal in the form of a voltage potential. The output potential is routed to an opto-electronic system which records the position on a track where the stylus contacted the workpiece. A touch probe which similarly measures linear dimensions by using positional sensors is disclosed in U.S. Pat. No. 4,553,332 to Galinelli, et al.

The contact sensing probes in McMurtry and Galinelli cannot simultaneously determine the probe's position in both axes of a cartesian coordinate plane unless a second track system is installed. This expensive, and often impractical, solution to dual axes location of the probe is a limiting factor imposed on the devices.

A sensing device to locate the rotational axis of an irregularly shaped object so that the axis is coaxial with a workpart chuck axis is disclosed in U.S. Pat. No. 4,790,545 to Dzewaltowski, et al. Though the invention in Dzewaltowski is capable of locating the position of a spatial characteristic on the workpiece (the center of rotation), the device is incapable of locating the position of any other characteristic.

A probe for measuring deviations from linearity of straight tubular passages is disclosed in U.S. Pat. No. 4,651,436 to Gaal. The invention in Gaal uses sensors to generate electrical signals when the probe encounters deviations from linearity (distortions) in a tubular passage.

The invention in Gaal is incapable, however, of locating the position of a characteristic on a plane defined by cartesian coordinates.

Several non-contact position sensing devices are capable of determining the position of a workpiece characteristic in relation to a defined area. A non-contact position and dimension sensing device utilizing laser optics is disclosed in U.S. Pat. No. 4,131,365 to Pryor. The invention in Pryor senses the diffraction wave emitted from an object after an incident source of electromagnetic radiation has been directed on the object. The diffraction wave impinges on a detector which outputs a signal that is translated into the particular measurement of interest. U.S. Pat. No. 4,662,752 to Tucker et al. discloses a box with a series of light sensors and beams. The invention in Tucker measures position and orientation of an object relative to a known position and orientation.

To operate the invention in Pryor, a substantial amount of specialized knowledge and electronic equipment is required. Further, in order to determine the position of a characteristic in two axes simultaneously, the electronic equipment must be doubled. The substantial set-up time and effort required between different types of characteristic measurement would make the device cumbersome for more than one specific application. Tucker similarly requires many expensive sensors and is limited to objects which fit into the box. Tucker also appears to be limited to measurements of objects rather than characteristics.

A coordinate measuring machine capable of measuring generally cylindrical objects is disclosed in U.S. Pat. No. 4,800,652 to Ballas, et al. The machine in Ballas is very large and expensive and determines the position of a characteristic by a different method than the present invention. Ballas utilizes multiple probes and a unique coordinate system only compatible with generally cylindrical objects.

Touch probes having position sensors on one or more axes defining the position of a characteristic are known in the art. A touch probe operable in two axes for gauging and indication applications is disclosed in U.S. Pat. No. 4,542,590 to Cusack. The probe in Cusack has a stylus extending from a body which contains mechanical sensing means and electrical sensors. The sensing means is movable within a small range of motion and held in a rest position by a series of reed and wire springs. Movement of the probe stylus produces a concomitant movement in the sensing means which is detected by several electrical contacts. The design of the probe in Cusack precludes simultaneous three-axis positional information.

A three-axis touch probe is disclosed in U.S. Pat. No. 4,937,948 to Herzog, et al. Three-axis movement is made possible by flexible leaf springs in a Hooke's joint. Deflection of the probe stylus from the rest position is sensed by measurement grids in an incremental distance measuring system.

DEFINITIONS AND EXPLANATIONS OF TERMS

For purposes of this application, the following definition as generally used in the art will be employed.

The word "characteristic" refers to a feature or aspect of the work part for which position indices are desired.

SUMMARY OF THE INVENTION

The present invention solves many of the drawbacks of position indicators by facilitating simultaneous multi-axis positional information from a low-cost, portable, and versatile true position probe. The invention can be used as a touch probe in a CMM or it can provide positional information when used in non-automated applications. The true position of a spatial characteristic can be determined accurately, quickly, and inexpensively. Set-up costs and time are also minimized due to the simplicity of operation of the true position probe.

The invention of this application is a contact-type probe for determining the true position of a characteristic in relation to a cartesian coordinate system. The device can measure the position of the characteristic simultaneously in the X, Y, and Z axes.

In operation, a probe shaft moves simultaneously in the measuring axes to contact the characteristic while the body of the probe remains in a defined position. A plurality of sensors determines the magnitude of probe shaft movement (substantially linear displacement in each axis) and thus determines any disposition of the characteristic. The probe is especially effective for determining the true position of an aperture in a surface of a workpiece but can be adapted for other types of characteristics.

The linear disposition of a characteristic with respect to a standard for the position of the characteristic is a determination often made during a manufacturing process. For example, if the position of several apertures in a product is critical, a determination of the disposition of each aperture from a standard position will provide information useful in determining if the product is fit for its specific use. Quality control measures generally specify tolerances on disposition of a characteristic from the standard so that if the tolerances are exceeded, the product is deemed unacceptable.

Disposition of a characteristic is usually determined in relation to orthogonal axes of a cartesian coordinate system (X, Y, and Z). The origin of the coordinate system ($\phi$, $\phi$, $\phi$) is usually defined in one of two ways. (The symbol "$\phi$" represents the numeral zero. First, the origin can be an arbitrary point chosen out of convenience. The position of each characteristic is then the indices of each of the axes where the characteristic is located in relation to the origin. Disposition occurs when the characteristic deviates from the indices defining the position of the characteristic. The degree of disposition would be the deviation in each axis from the defined indices An alternate method of determining the position of a characteristic is to define the position of the characteristic as the origin. Each characteristic would be defined by its own coordinate system, with correct positioning being $\phi$, $\phi$, $\phi$ in each case. Disposition using this method would then be deviations of the characteristic from the origin in any of the axes defining its position.

The present invention allows the disposition of a characteristic to be determined simultaneously in each axis defining the position. The present invention thus obviates the need to change or alter the position probe in order to determine the position of a characteristic in more than one axis. The present invention can be fitted as a touch probe to a coordinate measuring machine (CMM) or used alone for single workpiece positional determinations.

The present invention comprises a probe shaft mounted in an articulating swivel apparatus capable of movement in two axes. The swivel apparatus and a position sensing device for each axis of measurement are mounted to a probe body. The probe shaft communicates work piece positional information to sensors which provide a digital or analog record of the positions depending on the type of sensor employed.

The invention is capable of determining linear disposition of a variety of characteristics. Different applications are possible by changing a workpiece contact at the end of the probe shaft. For example, a precision ball fitted to the probe shaft will contact and fit into an aperture and relay its position to the sensors. For optimal accuracy, the contact should be slightly larger and a close simulation of the characteristic being measured. If the contact is smaller than the aperture so that it fits completely within it, accuracy can be compromised due to the latitude between the contact and the aperture. Other characteristics such as slots and protrusions can be positionally determined by using a contact which is a close simulation of the characteristic being measured. The contact can be varied to suit the needs of the user by substituting a different type of contact.

The probe body has a longitudinal axis and an end structured for mounting in a machine such as a CMM, numerically controlled milling machine or non-automated machine tool. Substantially all of the other components mount to the probe body. The probe body is preferably constructed from a metal with a low coefficient of expansion such as 6061 T6 aluminum. The swivel means includes a shaft which fits into a bearing mounted in the probe body. The bearing axis of rotation is orthogonal to the longitudinal axis of the probe body and defines one of the measuring axes of the true position probe. The swivel further contains a pivot axis orthogonal to both of the aforestated axes. The three orthogonal axes can be visualized as defining the axes of a cartesian coordinate system.

The probe shaft is preferably constructed from a hard metal with a low coefficient of expansion such as 4142 alloy. The probe shaft fits into a slot in the swivel and is pinned to it at the pivot point. The slot is deep enough to allow the probe shaft to move through an axis of rotation around the pivot point. A hardened contact which is a close simulation of the characteristic being measured may be fitted to the distal end of the probe shaft to contact the work piece.

The true position probe as thus described defines three axes designated X, Y, and Z; the Z axis corresponding to the longitudinal axis of the probe body. The probe shaft is moveable in the X and Y axes by means of the swivel and can be adapted for movement in the Z axis.

In operation, as the contact on the distal tip of the probe shaft moves across the surface of the work piece, it will engage the characteristic being gauged. The contact will position itself into the characteristic (such as an aperture) independent of the position of the probe body. If the position of the probe body is defined as the zero point (0,0,0) on each axis, any deviation from these coordinates will be disposition or deviation in the corresponding axis. Since the probe shaft can swivel in two axes independent of the probe body, the deviation of the probe shaft position from the probe body position will be indicative of disposition of the characteristic. A deviation in a measuring axis at the distal end of the probe shaft translates to a corresponding deviation at the proximal end of the shaft due to the pivot axes of the shaft. This disposition is sensed by sensors mounted in the probe body and in communication with the proximal end of the probe shaft along each axis of motion.

Various types of positional sensors may be used in the true position probe. A direct contact-type sensor such as a dial indicator may be used to communicate directly with the proximal end of the probe shaft. Movement of the proximal end of the probe shaft is sensed by the dial indicator which will record the magnitude of the movement. Other types of sensors such as linear variable differential transformers and laser sensing devices may be fitted to the probe. These types of sensors have an advantage of added sensitivity, and many can be calibrated for use in unusual applications.

DETAILED DESCRIPTION OF THE INVENTION

Figure 1:
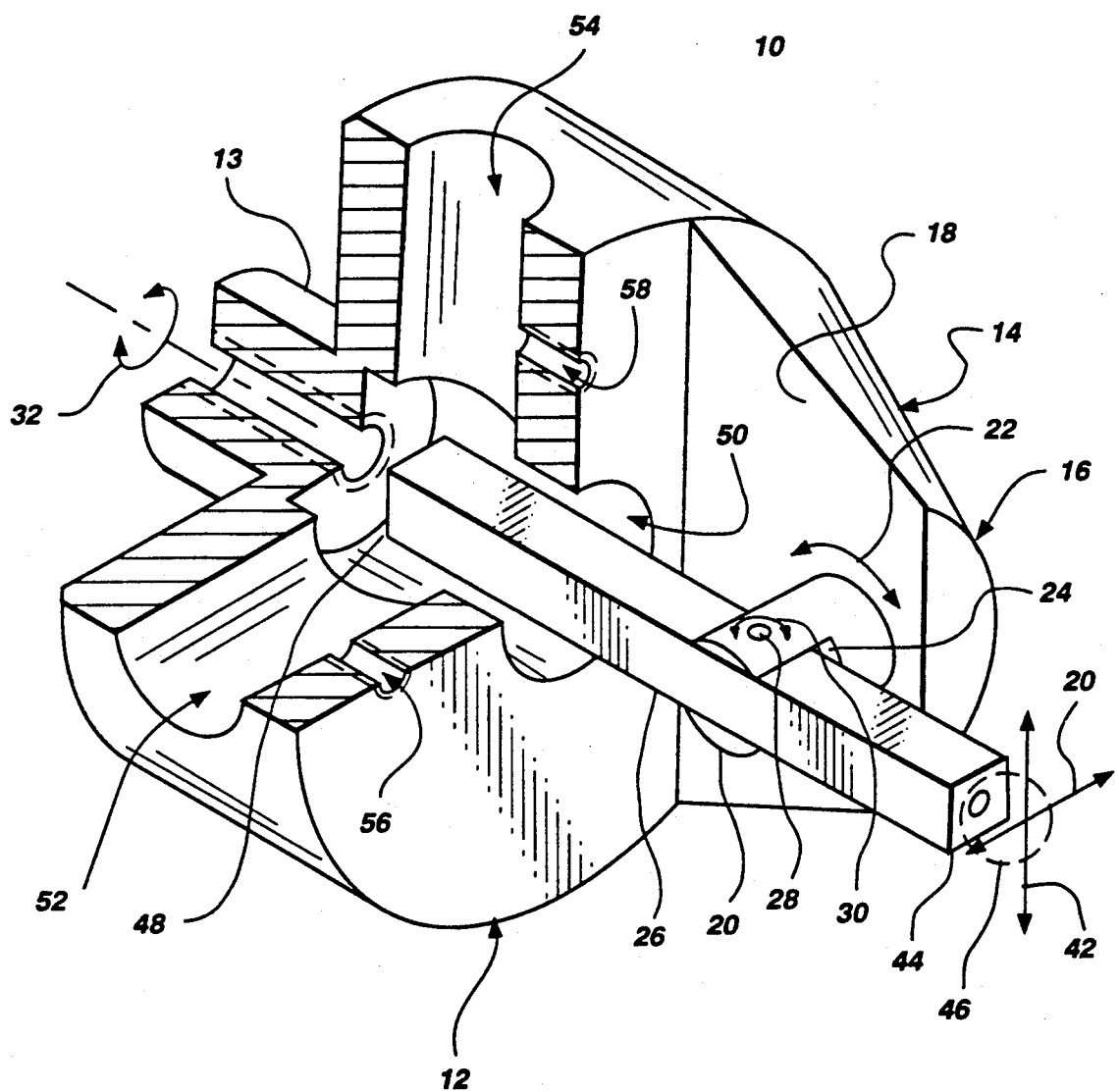
FIG. 1 is a perspective view of the true position probe with a portion of the probe body cut away to illustrate the positioning of the sensing means.

Referring to FIG. 1 the probe 10 has a longitudinal axis 11 and a generally cylindrical probe body 12 with an end 13 adapted for mounting into a machine tool such as a coordinate measuring machine (CMM). The mounting end 13 is generally cylindrical in shape but of a smaller diameter than the balance of the probe body to facilitate mounting into a shuck or collet. The probe body 12 also has a nose piece 14 shaped generally as a portion of a cone after a longitudinal slice to one side of the rotational axis followed by removal of the larger piece. The nose piece 14 extends away from the cylindrical portion of the probe body 12 with the smaller end of the cone 16 being the distal end. The cone shape of nose piece 14 facilitates moving the probe into confined areas.

A probe shaft 26 is positioned along the longitudinal axis of the probe body 12. The proximal end 48 of probe shaft 26 is disposed within an interior passageway 50 and extends sufficiently toward mounting end 13 to be positioned proximate sensor passageways 52 and 54.

The distal end 44 of the probe shaft extends beyond the distal end 16 of nose piece 14. The probe shaft is supported by a double-swivel joint so that its distal end can freely describe a complete circle, albeit of a small diameter which is determined by the diameter of interior passageway 50, the proximity of the swine joint to passageway 50 and to the distal end 44.

The swivel joint is formed from a pair of axles (pins) oriented at 90° to one another to permit rotational movement about each axle such that the distal tip of the probe shaft has the freedom to describe a circle of a certain predetermined diameter. That portion of the shaft between the probe shaft tip and the swivel joint describes a cone as it is moved in its full range of motion.

Figure 2:
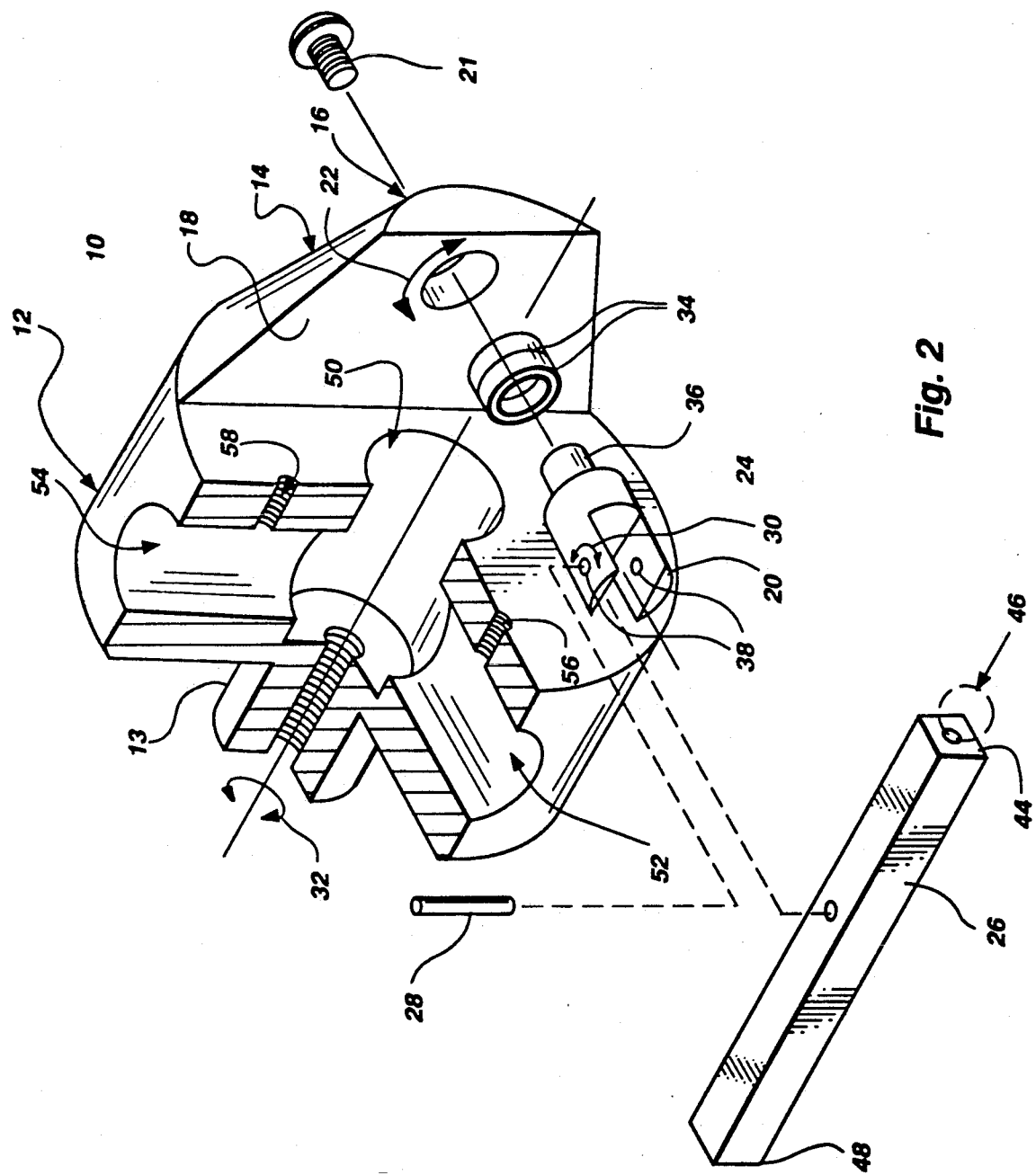
FIG. 2 is an exploded perspective view of the probe illustrating the positioning of the probe's components.

Referring to FIG. 2, nose piece 14 is adapted to receive a bearing 34 which fits into an aperture 15 in face of nose piece 34. Swivel 20 has an end 36 adapted to fit into the bearing 14 so that the swivel 20 rotates coaxially with the bearing 34 around the bearing axis of rotation shown generally as 22. The swivel 20 is held in place by means of screw 21. The swivel also Contains a slot 24 adapted to receive the probe shaft 26. Probe shaft 26 fastens to swivel 20 by means of a pin or axle 28 which fits through a pin passage 38a, 38b, and 38c extending through both the swivel 20 and the probe shaft 26. Slot 24 has a depth such that probe shaft 26 does not rest against the bottom of slot 24, and thus, a clearance (not shown) exists between probe shaft 26 and the bottom of slot 24. This clearance permits the probe shaft to rotate (swivel) a limited distance about pin 28. In the preferred embodiment, the proximal portion 31 between the proximal end 48 and the pin passage 38b of probe shaft 26 is greater than the distal portion 33 between pin passage 38b and distal end 44. This relationship may add sensitivity to positional determinations and will be described further when its function will be better understood. With the probe shaft 26 thus secured in the slot 24 of the swivel 20 by means of pin 28, the probe shaft 26 is moveable around the pivot axis of rotation shown generally as 30. Pivot axis 30 is orthogonal to bearing axis 22, and both axes 30 and 22 are orthogonal to the longitudinal axis 32 of the probe body 12.

Referring again to FIG. 1, the probe shaft 26 is positioned along the longitudinal axis 11 of probe body 12. The proximal end 48 of probe shaft 26 is disposed within interior passageway 50 and extends sufficiently toward mounting end 13 such that proximal end 48 is positioned proximate sensor passageways 52 and 54. The distal end 44 of probe shaft 26 extends beyond the distal end 16 of nose piece 14.

In the preferred embodiment, when probe shaft 26 is pinned to swivel 20, the two axes Of rotation 22 and 30, facilitated by swivel 20, allow the distal end 44 of probe shaft 26 to freely describe a complete circle. The size of the circle described is limited by the diameter of interior passageway 50 into which the proximal free end 48 of probe shaft 26 extends. The proximity of swivel 20 to interior passageway 50 may also determine the size of circle the probe shaft 26 can describe. Generally speaking, the further swivel 20 is from interior passageway 50, the smaller the circle that can be described. Finally, the depth of slot 24 may limit the circle size that probe shaft 26 can describe. Slot 24 should be deep enough to allow sufficient rotation around pivot axis 30 so that probe shaft 26 can describe a circle diameter suitable for a particular user application.

Through a few degrees of rotational motion, the rotational movement around axes 30 and 22 approximates linear motions in axes 40 and 42 respectively at the distal end 44 of the probe shaft 26. The tip of the probe shaft actually transcribes a small, flat arc which is of a chord length and radius to effectively be considered linear.

Distal end 44 of probe shaft 26 is adapted for attachment to a workpiece contact 46. Proximal free end 48 of probe shaft 26 extends into the probe body 12 through interior passageway 50, as previously described. Two sensor passageways 52 and 54 extend through the probe body 12 parallel to axes 40 and 42 respectively and communicate with interior passageway 50. Sensor passageways 52 and 54 are structured to receive various types of position sensors (not shown). The sensors detect movement of proximal end 44 of the probe shaft 26. The sensors are secured in sensor passageways 52 and 54 by means of set screws (not shown) extending into the passageways through threaded holes 56 and 58.

The relationship between proximal portion 31 and distal portion 33 of probe shaft 26 may be used to add sensitivity to positional determinations. The relationship allows a given displacement at distal end 44 to translate to a larger displacement at proximal end 48. This allows the user to obtain more accurate positional information by calibrating the positional sensors to the greater displacement at the proximal end 48. Equal lengths of portion 31 and portion 33 provides direct positional information, although unequal lengths, as described, increases sensitivity. When proximal portion 31 equals the combined length of distal portion 33 and attached workpiece contact 46, direct 1:1 positional information is provided.

Position sensors may be a variety of types according to user preference and application. Contact-type sensors such as dial indicators may be used when direct positional information is conveyed. The user may wish to obtain a greater degree of accuracy than provided by a dial indicator and choose a digital electronic indicator as the sensor. For special applications, other types of sensors may be employed to give the desired positional result. For example, the distal portion 33 may be extended to fit into a confined space. The relationship between distal portion 33 and proximal portion 31 is no longer direct 1:1, and a displacement at distal end 44 is not accompanied by an equal displacement at proximal end 48. In this case, the user may desire to use a positional sensor which can be calibrated to correct for the proportional difference.

Figure 3A:
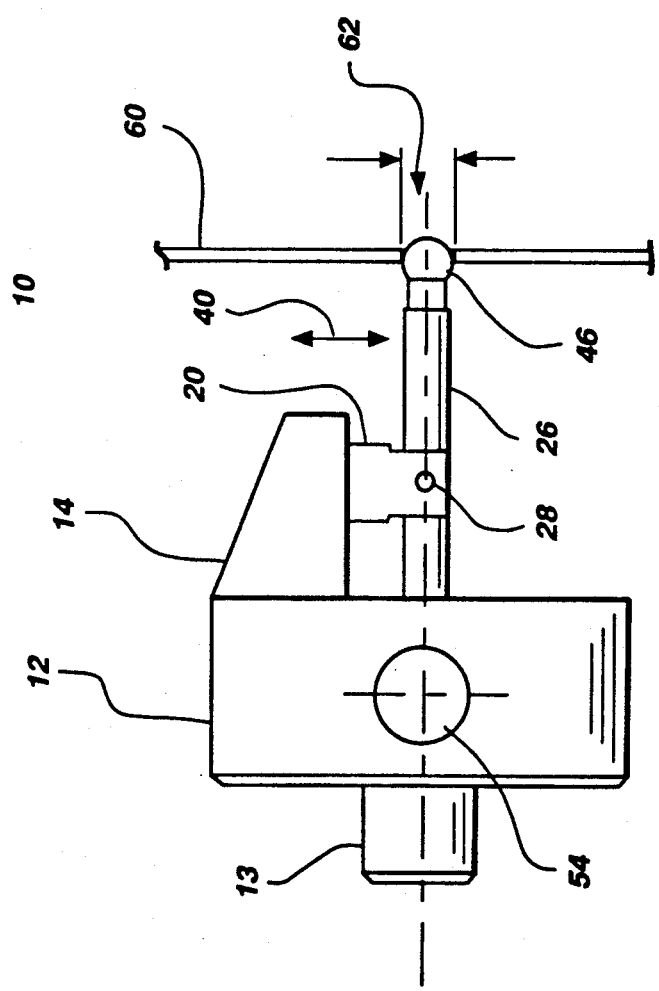
FIG. 3a is an elevated view of the probe showing the longitudinal axis of the probe body and showing the workpiece contact at the distal end of the probe shaft in close simulation with a characteristic in a workpiece while the probe shaft is undisplaced along the longitudinal axis.
Figure 3B:
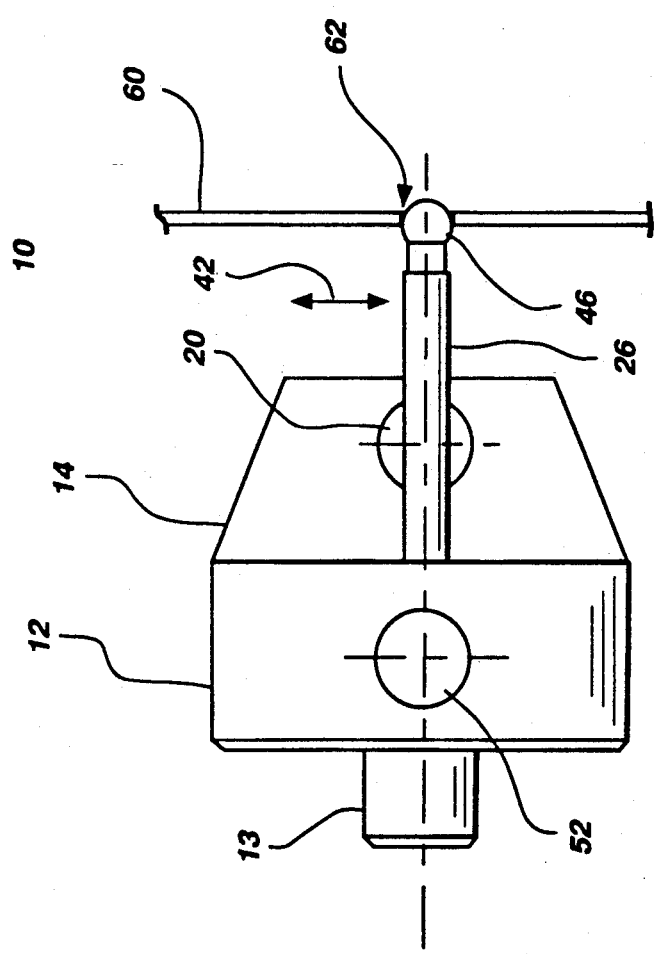
FIG. 3b is a plan view of the probe after a 90 degree rotation from the position in FIG. 3a showing the longitudinal axis of the probe body and showing the workpiece contact at the (distal end) of the probe shaft in close simulation with a characteristic in a workpiece while the probe shaft is undisplaced along the longitudinal axis.

Referring to FIGS. 3a and 3b, as the workpiece contact 46 moves across the surface of the work piece 60, the contact 46 will engage the characteristic 62 as shown in FIGS. 3a and 3b. The correct position of the characteristic 62 may be defined in relation to the origin on the plane defined by axes 40 and 42. If the contact 46 is positioned in the characteristic 62 as shown in FIGS. 3a and 3b and the contact 46 is positioned at the origin of the plane defined by axes 40 and 42, then the characteristic is in the exact position as defined. FIG. 3a shows the probe shaft aligned along axis 40 while FIG. 3b shows the probe shaft aligned along axis 42.

Figure 4:
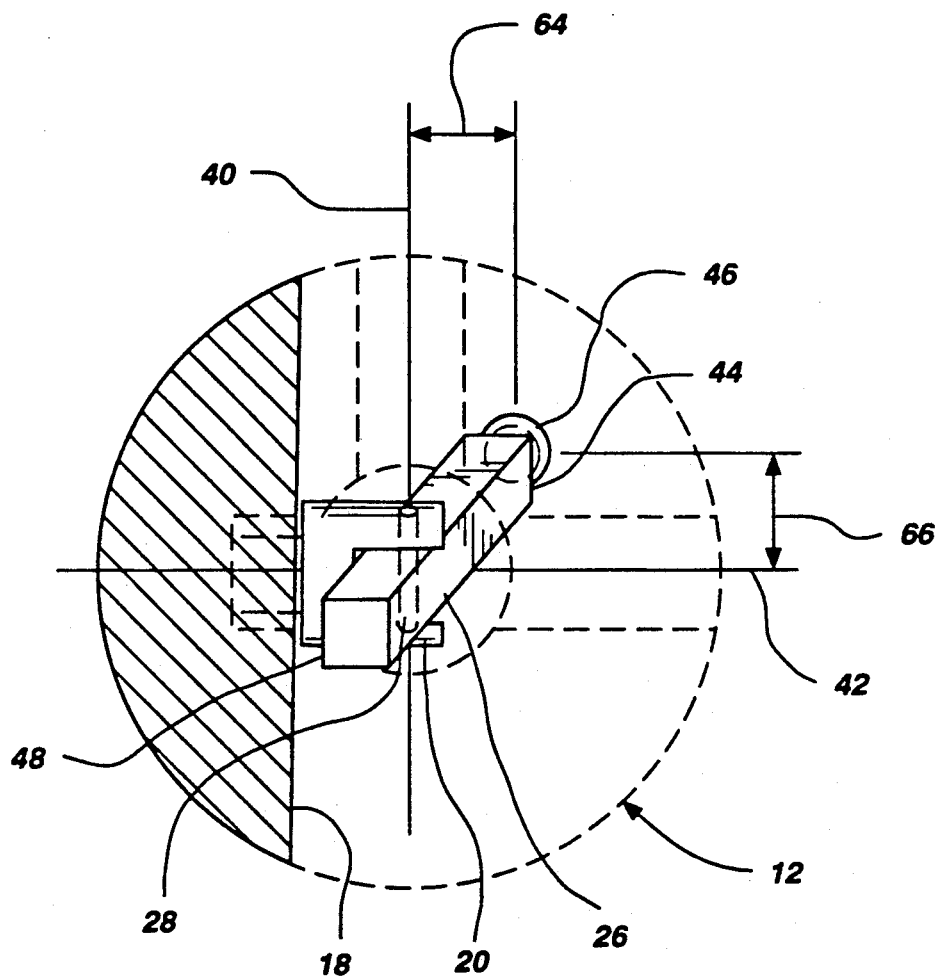
FIG. 4 is an end elevation view of the probe as viewed along the longitudinal axis and with the probe shaft simultaneously displaced in two axes.

Referring to FIG. 4, if the characteristic 62 is shifted or dispositioned from the defined position as shown, the contact 46 will still shift to the exact position of the characteristic 62. In this situation, the probe body 12 remains in the defined position while the probe shaft 26 swivels independently in axes 22 and 30 to engage the characteristic 62. The contact 46 will no longer be located at the origin of the plane defined by axes 40 and 42 due to disposition in axes 40 and 42 as indicated by distances 64 and 66. When distal end 44 of probe shaft 26 is displaced as shown in FIG. 4, a concomitant displacement occurs at proximal end 48. The amount of displacements 64 and 66 in each of axes 40 and 42 at proximal end 48 is sensed by the sensors located parallel to axes 40 and 42. The degree or amount of dispositions 64 and 66 is thus simultaneously measured in the two axes defining the characteristic 62. The true position of the characteristic 62, in relation to a defined coordinate system, is determined from the sensor readings in each axis defining the position.

As previously stated, the sensors positioned in sensor passageways 52 and 54 may be of various types. Common dial indicators can be used to communicate directly with proximal free end 48. Movement of proximal end 48 is thus sensed by the dial indicators which will indicate the magnitude of movement in each of axes 40 and 42. Other types of sensors such as linear variable differential transformers (LVDT's) and laser sensors may also be used in the true position probe. These types of sensors offer added sensitivity for very close tolerance work. Some may be calibrated for unusual applications such as when distal portion 33 must be extended to fit into a confined area. In this instance, displacement is not 1:1 between workpiece contact 46 and proximal end 48 of probe shaft 26, and the positional sensor should be calibrated to account for the actual displacement ratio.

The preceding discussion, for the purpose of simplicity, described determination of disposition of a characteristic defined according to two axes. It should be understood that the true position probe is not limited to two axes determinations but can be adapted to provide disposition in a third, Z, axis. In this embodiment, a third position sensor is situated to measure in the axis defined by the longitudinal axis 11 of the probe body. Disposition along this axis (such as elevation disposition), would then be indicated simultaneously with the planar disposition determinations.

What is claimed is:
1. A contact-type sensing probe comprising:
  a probe body having an interior passageway along a longitudinal probe body axis and structured for mounting in a machine tool
  a bearing mounted to said probe body having a bearing axis of rotation orthogonal to said longitudinal axis of said probe body;
  swivel means having a first end structured to engage said bearing and rotate coaxially with said bearing axis of rotation and a second end having a slot and further having a swivel pin passageway defining a pivot axis of rotation orthogonal to said bearing axis of rotation and said longitudinal probe body axis; and
  a probe shaft having a distal end, a proximal end extending into said interior passageway of said probe body and a probe shaft pin passageway structured to be coaxial with and a continuation of said swivel pin passageway in said swivel, said probe shaft being structured to fit into said slot in said swivel and receive a pin extending through said swivel and probe shaft pin passageways such that said probe shaft pivots around said pivot axis;
2. A contact-type sensing probe according to wherein a workpiece contact is attached to said distal end of said probe shaft.

3. A contact-type sensing probe according to claim 1 wherein said probe body is structured such that a sensing means may be mounted thereon.

4. A contact-type sensing probe according to claim 3 wherein a component of said sensing means is a mechanical dial indicator.

5. A contact-type sensing probe according to claim 3 wherein a component of said sensing means is a linear variable differential transformer.

6. A contact-type sensing probe for locating the position of a characteristic simultaneously in at least two axes comprising:
- a probe body having an interior passageway along a longitudinal probe body axis, a mounting end structured for mounting in a machine tool, a sensor mounting portion structured to mount a sensing means, and a swivel mounting portion extending from the sensor mounting portion having a face parallel with said probe body axis;
- a bearing mounted in said face of said swivel mounting portion and having a bearing axis of rotation orthogonal to said longitudinal axis of said probe body;
- a probe shaft having a distal end, a proximal end extending into said interior passageway of said probe body and a probe shaft pin passageway defining a pivot axis;
- swivel means having a first end structured to engage said bearing and rotate coaxially with said bearing axis of rotation and a second end having a slot structured to receive and support said probe shaft and having a swivel pin passageway extending on either side of said slot and structured to be coaxial with and a continuation of said probe shaft pin passageway, said passageways structured to receive a pin extending through said swivel and probe shaft pin passageways and defining a pivot axis orthogonal to said bearing axis and said probe body longitudinal axis and around which said probe shaft can pivot; and
- sensing means mounted to said probe body and configured to sense the movement of said proximal end of said probe shaft.

7. A contact-type sensing probe according to claim 6 wherein a component of said sensing means is a mechanical dial indicator.

8. A contact-type sensing probe according to claim 6 wherein a component of said sensing means is a linear variable differential transformer.

9. A contact-type sensing probe according to claim 6 wherein a workpiece contact is attached to said distal end of said probe shaft.

* * * * *